Nov. 20, 1956   E. F. HUDDLE   2,770,937
METHOD OF HARVESTING AND CURING FORAGE CROPS
Filed March 17, 1952

INVENTOR.
Edwin F. Huddle
Paul O. Pippel
Atty

United States Patent Office 2,770,937
Patented Nov. 20, 1956

2,770,937
METHOD OF HARVESTING AND CURING FORAGE CROPS

Edwin F. Huddle, Elmwood Park, Ill., assignor to International Harvester Company, a corporation of New Jersey Application March 17, 1952, Serial No. 277,034

6 Claims. (Cl. 56—1)

This invention relates to forage crops and more specifically to a novel method of harvesting such crops from the fields in a manner obtaining efficient curing of the crops while retaining maximum food value of components such as carotene in the leafy portions of the crops.

For many years numerous attempts have been made to promote more efficient curing of hay. All of these attempts were principally based upon the assumption that it was only necessary to dry the hay. The accepted practice included windrowing generally to facilitate subsequent gathering. Windrowing machines, whether auger or draper delivery all stacked the hay in somewhat shingle fashion with the leaves exposed and the stems buried by successive layers of plants, and side delivery rakes piled the hay helter skelter into windrows without regard to the position of the leaves or stems of the plants as to exposure to the sunlight. As a result, the tender thin leaves, which contain the major portion of the food content of the plant, were exposed to the direct sunlight and burned crisp and crushed off the stems when the plants were turned, gathered or bundled into bales. The intensive drying of the leaves also destroyed the carotene, the chlorophyl and other various food and vitamin factors.

Having these deficiencies in mind, the general object of the invention is to provide a novel unit for positioning such forage crops in an ideal, novel manner to obtain efficient drying thereof while preserving its food and vitamin content.

A more particular object of the invention is to devise a novel pickup and windrow unit formed and arranged to discharge such forage crops with their leafy heads between the stubble and the stem ends upstanding from the stubble whereat the stem ends are exposed to the sunlight and the leafy part is protected within the stubble. The drying of the heads is thus inhibited while simultaneously the drying of the stems is materially accelerated. This has been found not only to accelerate the curing time but also to prevent the leaves from drying brittle and crushing out before the stems are properly cured.

A further object of the invention is to devise a novel method which includes laying the crop upon cutting by a mower in a natural shingle-like lay in which fashion it is picked by a pickup and each plant delivered lengthwise transversely to the axis of an auger positioned in receiving relationship to the pickup, the auger discharging laterally with respect to the line of draft of the machine and effective to turn each plant so that it is angled transversely to the line of draft and then deposited from a height such as to cause the head ends of the plants to drop between the stubble.

These and other objects of the invention will become more apparent from the specification and the drawings, wherein.

Figure 1:
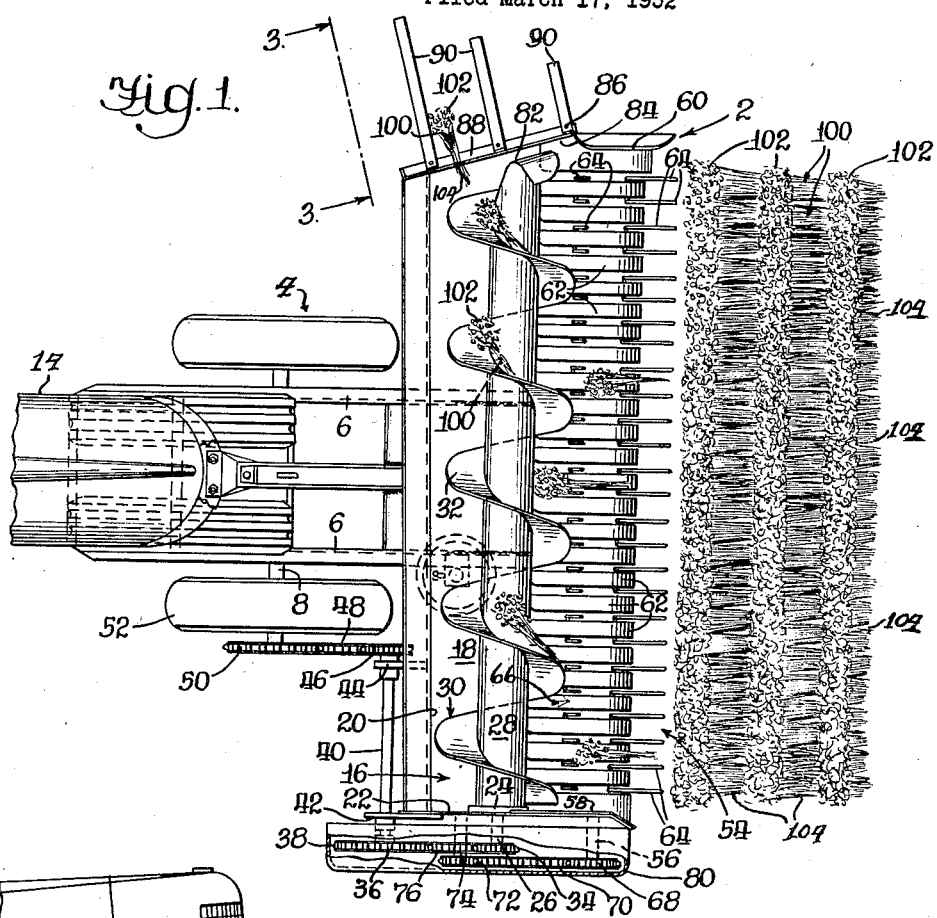
Figure 1 is a top plan view partially broken away and in section of the novel pickup and windrower unit in association with a driving tractor fragmentarily shown and the lay of the crops exaggerated to show the relative positions of the lines of cutting.

The structure herein shown is also illustrated in my co-pending application, Serial Number 277,033, filed March 17, 1952, now U. S. Patent 2,735,253, and entitled Tractor Implement Coupling Arrangement which covers the coupling arrangement, and comprises a combination pickup and windrower generally designated 2 including a mobile wheeled framework or ambulant support structure generally indicated 4, the framework 4 comprising a pair of laterally spaced beams 6, 6, interconnected intermediate their ends by a transverse axle 8 and supporting at their rear extremities a saddle 10 adapted to couple with the steering truck 12 of an associated tractor 14 as more fully set forth in the aforementioned co-pending application.

The forward ends of the beam members 6, 6, extend beneath a trough or platform generally designated 16 and connected as by welding to a bottom wall panel 18 thereof which is elongated transversely to the line of draft of the unit and at its rear edge merges with the bottom edge of a rear upstanding panel 20. The grassward end of the platform is provided with an upstanding end wall 22 connected to the adjacent lateral margins of the bottom and rear webs of the platform 16 preferably as by welding and provided with a bearing 24 journalling a transverse shaft 26 which is connected to a core 28 therewithin of an auger generally designated 30, the auger being provided with flights of sinistrorsal convolution about the core 28 and extending above the platform 16 and longitudinally substantially co-extensive therewith laterally with respect to the line of draft of the unit.

The shaft 26 is provided outwardly of the wall 22 with a sprocket 34 fixed thereto, the sprocket 34 having a chain 36 trained thereabout which is also trained about a sprocket 38 positioned to the rear of the sprocket 26 and keyed to one end of a counter-shaft 40 which is journalled at laterally spaced points from bearings 42 and 44 mounted as by welding to the end wall 22 and the rear panel 20, respectively, of the platform.

The shaft 40 is provided at its opposite end with a sprocket 46 keyed thereto, the sprocket 46 being driven by a chain 48 which is trained about a sprocket 50 connected to an adjacent ground wheel 52 mounted on the beforementioned axle 8.

Figure 2:
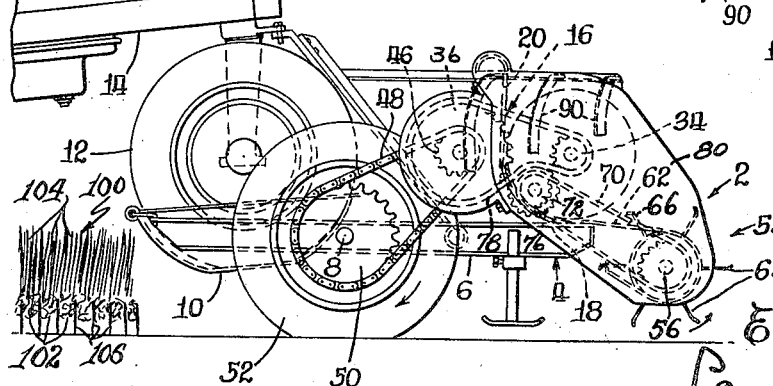
Figure 2 is a side elevational view of the structure and a portion of windrow formed in accordance with the invention shown in Figure 1; and, Figure 3 is a fragmentary rear view of the stubbleward end portion of the windrower substantially as identified by the line 3—3 of Figure 1, with a portion of the trough broken away to show the discharge end of the auger.
Figure 3:
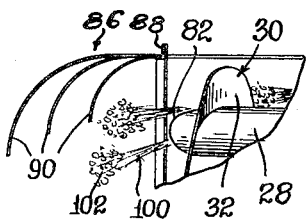

As best seen in Figure 2, the wheel 52 rotates in a clockwise direction, as shown by the arrow, which, in turn drives the shaft 40 in a clockwise direction and this in turn drives the auger in a clockwise direction so that it sweeps downwardly on its forward side.

A pickup generally designated 54 is positioned immediately ahead of the auger and is longitudinally substantially coextensive therewith laterally with respect to the line of draft of the unit. The pickup 54 is of conventional design (see U. S. Patents 2,256,829 and 1,815,327) and may include a center reel shaft 56 which at each end may be journalled from bearings within end walls 58 and 60 at opposite ends of the reel, the wall 58 being formed as a continuation of the wall 22 and the wall 60 generally paralleling the wall 58. Intermediate the walls 58 and 60, the pickup may comprise a series of laterally spaced stripper bars 62, 62 between which and through which may pass fingers 64, 64 which are connected through a conventional spider as in the above patents to the shaft 56. The rotation of the pickup reel or drum, including the shaft 56, the spider and connected fingers, is in a counter-clockwise direction as shown by the arrow in Figure 2, the fingers emerging from between the stripper bars there below and sweeping the crop upwardly there in front onto the deck generally designated 66 formed by the stripper bars 62, 62 at the top side of the pick-up. It will be seen, particularly from a consideration of Figure 1, that the stripper bars 62, 62 extend rearwardly beneath the flighting 32 of the auger and from Figure 2 it will be noted that the path of the finger 64 and particularly the area of the deck ahead of the region of disappearance of the fingers through the deck is overlapped vertically by the flighting 32. This arrangement provides for a positive feed by the fingers 64 to the auger flights 32.

Drive for the pickup reel is established by means of a sprocket 68 fixedly connected to an end of the shaft 56, the sprocket 68 meshing with a drive chain 70 which is trained about a sprocket 72 journalled on a stub shaft 74 and connected with another sprocket 76 laterally spaced with respect to sprocket 72, the sprocket 76 meshing with the lower flight 78 of the before-mentioned chain 36 which drives the sprocket 34. The stub shaft is mounted on the end wall of the platform. All of the drives are enclosed within a housing 80 connected to the outboard side of the walls 24 and 58.

It will be seen that the pickup 54 is arranged for direct sweeping engagement by its fingers 64 to the ground and that the auger 30 is positioned upwardly and rearwardly thereof. I have found that the auger must be positioned preferably about 24 inches above the ground for the purpose hereinafter explained.

The discharge end 82 of the auger is disposed approximate and in alignment with a rearwardly outwardly angled outlet opening 84 defined between the rear extremity of the wall 60 and the rear and bottom walls 20 and 18 of the platform. This outlet opening 84 is disposed at the stubbleward end of the machine and the upper extremity of the opening is defined by a fingered deflector 86 which includes a cross piece 88 extending between and connected to the upper margins of the walls 60 and 20. A plurality of fingers 90, 90 are connected at one of their ends to the cross piece 88 and extend outwardly therefrom in a stubbleward direction, the fingers 90, 90 being angled rearwardly and bent downwardly at desired distances to provide deflectors.

In operation, the unit herein described is used in conjunction with a conventional mower and crusher unit, such as shown in U. S. Patent 1,958,910, which immediately precedes the instant machine. The unit shown in the said patent mows parallel lines of cuttings which are delivered through crushing rolls which in turn lay the cuttings in shingle fashion upon the field; that is, each line of cutting is laid upon the preceding line cutting with the leafy portions of the plant, such as hay, at the upper rearward end. This type of lay is a natural mower cut lay and desirable for the pickup and windrower unit of the instant application in that the fingers 64 dig into the leafy portions and lift the plants in a manner such as shown diagrammatically in Figure 1 wherein each plant 100 is lifted by the fingers 64 onto the deck, head end 102 first, and advanced longitudinally to beneath the auger whereat the flighting 32 angles the plant 100 transversely to the line of draft of the unit in the direction of movement of the plant and discharges the plant 100 head first off the stubbleward end of the platform. I have found that by positioning the platform about 24 inches off the ground, the hay instead of laying upon the stubble when discharged off the platform is caused to drop headfirst into the stubble so that the stems 104 are positioned up, in which position they are afforded effective aeration as well as direct exposure to the sunlight while the leafy portion is buried within the stubble 106 (Figure 2) and is thus protected from the direct sunlight thereby materially improved its chlorophyl and carotene content.

It will be understood that the present invention may be practiced with or without crushing the hay, however, the latter is preferred.

I claim:

1. A method of harvesting growing forage plants composed of stems with leafy matter at the head ends which comprises cutting down the plants at the stems in progressive parallel lines of cutting and to leave a stubble, then immediately crushing the plants of each line of cutting, then immediately laying the plants in a swath upon the field with each line of cutting laid upon the preceding in shingle-fashion and with the leafy heads of each line of cutting laid upon the stems of the preceding line of cutting, then immediately picking and elevating successive lines of cutting, while turning the same sidewise and conveying them laterally of the swath with the head ends of the plants end first in the direction of movement, and then depositing each line of cutting into a windrow by dropping each plant head end first into the stubble so as to bury the head end between the stubble and position the stem end up out of the stubble.

2. A method of harvesting cut forage plants composed of stems with leafy heads and laid shingle-fashion head end rearward in a preformed swath in a field, the steps of raising each line of cutting in succession to a predetermined elevation, then conveying each line of cutting laterally while turning each plant with its head in the direction of lateral movement thereof, and then dropping each plant from said elevation head first into the stubble in the field to bury the head between the stubble and position the stem extending out of the stubble and exposed to the natural elements.

3. A method of field curing forage crops which have been cut down to leave a stubble and having stems with leafy matter localized at the head of the plant, comprising positioning each plant head down with its head buried between the stubble and its stem extended upwardly out of the stubble and exposed to the natural elements and wherein each plant immediately after it is cut down and immediately before positioning is crushed to split its stems.

4. A method of processing forage crops standing in the field and having stems with leafy ends comprising the steps of first reaping the crops to leave a stubble, then immediately crushing the crops, then immediately laying the crops on the stubble, then immediately gathering the crops off the stubble and depositing the same into windrows with the leafy ends concealed in the windrow and the stems exposed.

5. A method of field curing forage crops which have stems with leafy matter localized at the heads of the plants and which have been cut down to leave a stubble, comprising the steps of crushing the plants to split their stems immediately after they have been cut down, and then immediately positioning the plants head down with their heads buried in the stubble and with their stems extending upwardly out of the stubble and exposed to the natural elements.

6. A method of field curing forage crops which have stems with leafy matter localized at the heads of the plants and which have been cut down to leave a stubble, comprising the steps of crushing the plants to split their stems immediately after they nave been cut down, and then immediately positioning the plants head down in a windrow with their heads buried in the stubble and with their stems extending upwardly out of the stubble and exposed to the natural elements.

References Cited in the file of this patent

UNITED STATES PATENTS

| | | |
|---|---|---|
| 1,166,136 | Leasure | Dec. 28, 1915 |
| 1,590,125 | Sciford | June 22, 1926 |
| 1,917,556 | Soss | July 11, 1933 |
| 1,958,910 | Christiansen | May 15, 1934 |
| 2,240,168 | Adkisson | Apr. 29, 1941 |
| 2,430,734 | Raney et al. | Nov. 11, 1947 |
| 2,507,635 | James | May 16, 1950 |
| 2,592,270 | Getz | Apr. 8, 1952 |
| 2,609,651 | Cymara | Sept. 9, 1952 |
| 2,629,223 | Russell | Feb. 24, 1953 |
| 2,664,684 | Russell | Jan. 5, 1954 |

FOREIGN PATENTS

| | | |
|---|---|---|
| 116,000 | Australia | Oct. 9, 1942 |